Patented Feb. 23, 1937

2,071,704

UNITED STATES PATENT OFFICE 2,071,704

PROCESS FOR PRODUCING TETRAHYDROFURFURYL ALCOHOL

Wilhelm Normann and Hermann Prückner, Chemnitz, Germany, assignors, by mesne assignments, to Böhme Fettchemie-Gesellschaft mit beschrankter Haftung, Chemnitz, Germany No Drawing. Application June 16, 1932, Serial No. 617,685. In Germany November 7, 1931

4 Claims. (Cl. 260—54)

This invention relates to the production of tetrahydrofurfuryl alcohol and more particularly to a process of catalytically reducing furfural to tetrahydrofurfuryl alcohol.

According to one prior process of producing this compound, furfural while in alcoholic solution is hydrogenated in the presence of platinum oxide as a catalyst. In another prior process, the hydrogenation is effected in the presence of colloidal palladium together with other reducing agents. These processes besides giving a poor yield are not suitable for large scale production for commercial purposes because of their many operating difficulties, the high costs of the catalysts, and the rapidity with which the catalysts become ineffective.

According to a third known process, hydrogenation of furfural is carried out in the presence of 5% to 50% of water and a nickel catalyst, the yield of tetrahydrofurfuryl alcohol, however, being only about 69%.

The principal object of the present invention is to provide a process of hydrogenating furfural yielding a higher percentage of tetrahydrofurfuryl alcohol than heretofore obtainable.

A further object is to provide a process of producing this compound which avoids the use of extraneous liquids and other agents and the operating difficulties and expense connected therewith.

With these and other objects in view, the instant process was discovered wherein tetrahydrofurfuryl alcohol is obtained directly from furfural in almost quantitative yield. The furfural is treated at a temperature elevated to a moderately high degree under an elevated or high pressure in the presence of hydrogen and a hydrogenation catalyst. No solvents, liquids, or other agents need be used during the process.

The temperatures used in the instant process are most suitably between 110° and 200° C. Temperatures above about 200° C. should be avoided. The pressure is preferably between about 100 atmospheres and 250 atmospheres, but lower and higher pressures are satisfactory in some instances. With any substantial deviation from the above conditions, the yield of tetrahydrofurfuryl alcohol diminishes, and undesirable secondary products are formed.

Especially suitable as catalysts in the present process are the metallic hydrogenation catalysts of the metals of the eighth group of the periodic system such, for example, as cobalt and nickel. Other catalysts also may be used as, for instance, the mixed catalysts now known and used in the synthesis of methanol.

Mixed catalysts which have proved particularly effective include compositions composed of chromium together with cobalt, nickel, or copper or combinations thereof. The catalyst may be employed in a finely divided form arranged to make a large surface available to the reaction, as when deposited on a carrier such as a solid porous adsorbent as, for example, kieselguhr.

It is not necessary to the success of the instant process that the hydrogen be used in a pure form, for hydrogen mixed with other gas or gases which do not interfere with the hydrogenation is satisfactory.

The tetrahydrofurfuryl alcohol formed during the hydrogenation process is preferably separated by fractional distillation from the more volatile and the less volatile products which also form, the alcohol being collected as an intermediate fraction constituting about 80% to 90% of the furfural employed.

The tetrahydrofurfuryl alcohol thus obtained is usable without further purification for many commercial purposes, for example, as a solvent, as a washing agent, a purifying agent, or an emulsifying agent, and as a softener for plastic masses, etc.

*Example 1*

Into an autoclave there are introduced 100 grams of furfural and 10 grams of a catalyst composed of nickel deposited on kieselguhr. The autoclave is then closed, and hydrogen is introduced until a pressure of 100 atmospheres is reached. Thereupon heat is gradually applied until a temperature between 140° C. and 170° C. is reached. This temperature is maintained as long as any hydrogen is taken up in the reaction, several hours being sufficient. The nickel catalyst may be satisfactorily prepared by precipitating nickel hydroxide on the adsorbent and then reducing the hydroxide in a stream of hydrogen.

*Example 2*

50 grams of distilled furfural and 5 grams of a cobalt-chromium catalyst are poured into a shaking autoclave and are treated at a temperature of from 150° C. to 160° C. in the presence of hydrogen under a pressure of 200 atmospheres for a period of about 1½ hours. At the expiration of this period, no further absorption of hydrogen takes place. The final product forms a clear solution with water and is free from aldehydes. The cobalt-chromium catalyst may be made by mixing equimolecular amounts of cobalt nitrate and ammonium chromate previously dissolved separately in distilled water. The precipitate resulting from the mixing of the two solutions after filtering and drying is again suspended in distilled water, filtered off, and dried. The dried product is finally reduced in a stream of hydrogen at a temperature of about 500° C. for a period of about ½ hour.

Example 3

100 grams of distilled furfural and 10 grams of a nickel-chromium catalyst are introduced into a shaking autoclave, after which hydrogen is forced thereinto until a pressure of 250 atmospheres is reached. The mixture is then heated gradually up to 110°–150° C. and kept at this temperature until no further absorption of hydrogen takes place. After a period of about 1 hour, the reaction is complete. The product is then treated as explained in Example 1. The yield of tetrahydrofurfuryl alcohol is about 90% of the theoretical yield.

The nickel-chromium catalyst may be prepared by mixing equimolecular amounts of nickel nitrate and nickel chromate and reducing the mixture at as low a temperature as possible, for example, 350° C. The durability of this catalyst is much greater than that of other known hydrogenating catalysts.

Example 4

Into an autoclave are introduced 50 grams of furfural and 5 grams of a copper-chromium catalyst. Hydrogen is forced into the autoclave until a pressure of 200 atmospheres is reached. After about 5 hours' heating at 155° C., the reaction is complete and tetrahydrofurfuryl alcohol is obtained in almost a quantitative yield.

The copper-chromium catalyst may be formed in the same manner described for the making of the nickel-chromium catalyst in the preceding example.

Example 5

Into an autoclave are introduced 50 grams of furfural and 5 grams of a nickel-chromium catalyst. Hydrogen is forced into the autoclave until a pressure of 45 atmospheres is reached. After about 2¼ hours' heating at 130° to 140° C., the reaction is complete and tetrahydrofurfuryl alcohol is obtained in about 90% of the theoretical yield.

The reaction products are preferably purified by fractional distillation. The first few per cent of distillate collected is composed of amyl alcohol. The main fraction of the distillate, having a boiling range of 170°–190° C., is substantially pure tetrahydrofurfuryl alcohol having a hydroxyl number of 540, the estimated number being 550. The final fraction, equal to from about 8% to 10% of the furfural used, consists of a mixture of dihydroxy alcohols, which may be of the pentandiol type.

It is to be understood that the instant invention is not limited to the exact proportions of ingredients and the exact conditions above disclosed but includes all embodiments and variations coming within the scope of the appended claims.

Having thus described the invention, what is claimed as new and desired to be secured by Letters Patent is:

1. The process of preparing tetrahydrofurfuryl alcohol comprising heating furfural at a temperature of 110° C. to 200° C., under a superatmospheric pressure, in the presence of hydrogen and a catalyst containing essentially a member of the group consisting of nickel, copper and cobalt and chromium compounds of said metals, said catalyst being present in an amount not substantially less than 10% of the weight of furfural treated, and in the absence of water.

2. The process of preparing tetrahydrofurfuryl alcohol comprising heating furfural at a temperature of 110° C. to 200° C., under a pressure between 100 and 250 atmospheres, in the presence of hydrogen and a catalyst containing essentially a member of the group consisting of nickel, copper and cobalt and chromium compounds of said metals, said catalyst being present in an amount not substantially less than 10% of the weight of furfural treated, and in the absence of water.

3. The process of preparing tetrahydrofurfuryl alcohol comprising heating furfural at a temperature between 110° C. and 200° C. under a superatmospheric pressure, in the presence of hydrogen and a catalyst comprising essentially a compound of nickel and chromium, said catalyst being present in an amount not substantially less than 10% of the weight of the furfural treated, and in the absence of water.

4. The process of preparing tetrahydrofurfuryl alcohol comprising heating furfural at a temperature between 110° C. and 200° C., under a pressure between 100 and 250 atmospheres, in the presence of hydrogen and a catalyst comprising essentially a compound of nickel and chromium, in the absence of water.

WILHELM NORMANN.
HERMANN PRÜCKNER.